US006050454A

United States Patent [19]

Ludaescher et al.

[11] Patent Number: 6,050,454

[45] Date of Patent: Apr. 18, 2000

[54] NON-LETHAL FLUID DELIVERY DEVICE

[75] Inventors: Edward C. Ludaescher, Oxnard; Gary John Rovarino, Sr., Burbank, both of Calif.

[73] Assignee: Option Safety, LLC, Oxnard, Calif.

[21] Appl. No.: 09/277,031

[22] Filed: Mar. 25, 1999

Related U.S. Application Data

[60] Provisional application No. 60/079,295, Mar. 25, 1998.

[51] Int. Cl.[7] .............................. B67D 5/64; G01F 11/06; A63H 3/18

[52] U.S. Cl. .............................. 222/162; 222/325; 222/79

[58] Field of Search .............................. 222/78, 162, 325, 222/394, 79, 175

[56] References Cited

U.S. PATENT DOCUMENTS

| | | |
|---|---|---|
| 1,269,922 | 6/1918 | Gadecki . |
| 1,333,268 | 3/1920 | Masiates . |
| 2,124,172 | 7/1938 | Wildes et al. . |
| 3,109,253 | 11/1963 | Eig . |
| 3,298,125 | 1/1967 | Adrian et al. . |
| 3,374,708 | 3/1968 | Wall . |
| 3,619,930 | 11/1971 | Beermann et al. . |
| 3,706,151 | 12/1972 | McNeill . |
| 3,707,793 | 1/1973 | Holtor, II . |
| 3,733,727 | 5/1973 | Jones et al. . |
| 3,841,526 | 10/1974 | Haskins . |
| 3,956,843 | 5/1976 | Litman . |
| 4,058,921 | 11/1977 | Mason . |
| 4,316,388 | 2/1982 | Mason et al. . |
| 4,777,754 | 10/1988 | Reynolds, Jr. . |
| 5,088,624 | 2/1992 | Hackett et al. . |
| 5,225,623 | 7/1993 | Krasnow . |
| 5,397,029 | 3/1995 | West . |
| 5,473,501 | 12/1995 | Claypool . |
| 5,485,695 | 1/1996 | Glock . |
| 5,581,898 | 12/1996 | Thummel . |
| 5,671,559 | 9/1997 | Ludaescher et al. . |
| 5,787,628 | 8/1998 | Teetzel . |

FOREIGN PATENT DOCUMENTS

| | | |
|---|---|---|
| 118813 | 9/1918 | United Kingdom . |

OTHER PUBLICATIONS

International Search Report from Corresponding PCT Application Serial No. PCT/US99/06648 dated Jun. 18, 1999.

*Primary Examiner*—Kevin Shaver
*Assistant Examiner*—Keats Quinalty
*Attorney, Agent, or Firm*—Kelly Bauersfeld Lowry & Kelley, LLP

[57] ABSTRACT

A non-lethal fluid delivery device for discharging a debilitating or other inert fluid of choice is provided that allows the device to be easily held in the hand of the user in a way so as to somewhat conceal it from a target subject, wherein the device has a housing unit to hold and carry a replaceable pressurized canister holding the fluid of choice, an actuator button placed in the back of the housing unit to cause the discharge of fluid, and a safety cover over the actuator button. In a hand-held embodiment of the device, a lanyard is provided for placing around the user's wrist to hold and carry the device. In an alternative embodiment of the device of the invention, a bracket is provided to mount the device on another lethal weapon of choice to provide the user the ability to have simultaneous access to the device for discharge of non-lethal fluid and to the lethal weapon for use of lethal force, if necessary.

13 Claims, 7 Drawing Sheets

NON-LETHAL FLUID DELIVERY DEVICE

This application claims the benefit of U.S. Provisional Application 60/079,295, filed on Mar. 25, 1998.

BACKGROUND OF THE INVENTION

This invention generally relates to non-lethal weapons, and particularly to a device that can deliver a variety of non-lethal debilitating fluids and chemical agents to selected targets.

Law enforcement and other individuals are sometimes confronted with situations where they are faced with hostile human or animal subjects, and it is desirable to be able to defend themselves against such subjects or bring them under control. While law enforcement personnel often carry a lethal weapon such as a revolver, semi-automatic pistol, or sometimes even a more sophisticated rifle or machine gun, they are required to use only that level of force necessary under the circumstances to defuse the situation and bring the subject(s) under control. While that level of force may sometimes necessitate the use of a deadly weapon, more often, the use of a non-lethal force or weapon is sufficient. Accordingly, in addition to carrying one or more weapons capable of inflicting lethal force, law enforcement officers often carry one or more non-lethal weapons that can be deployed to debilitate hostile human or animal subjects before having to resort to the use of deadly force. In carrying these types of weapons, it is important to be able to have immediate and quick access to both the lethal and non-lethal weapons depending on the escalation level of the danger from the subject.

One example of existing non-lethal weapons systems available to law enforcement units is the belt-holstered hand operated chemical agent delivery devices that discharge chemical mace, pepper spray, or other non-lethal fluid. However, such existing devices suffer from several drawbacks. For example, once the chemical agent in the canister inside the unit is used up, the entire unit must be discarded, thereby raising costs of the unit. Also, since the canister inside the unit is not interchangeable, the user cannot train or practice with inert fluids such as water. Furthermore, existing units are held in an upright position, making it difficult for the user to be able to somewhat conceal the unit during handling, or to simultaneously hold and point the non-lethal weapon and a lethal weapon at the target.

The device of this invention addresses the need for a chemical agent delivery device which is easy to use, allows the user to hold the device in a somewhat concealed and more controllable manner while holding and pointing another lethal weapon at the subject, uses an interchangeable fluid container to hold the chemical agent of choice or other inert fluid therein, and is capable of attachment to another lethal weapon system.

SUMMARY OF THE INVENTION

In accordance with the invention, a device for delivering a debilitating chemical fluid is provided, wherein a generally elongated housing unit receives an interchangeable, replaceable canister containing a chemical substance of choice under pressure with the canister's outwardly biased discharge stem placed against a small aperture located at the front end of the housing and an actuator button that comes into contact with the opposite end of the canister located at another end of the housing, such that by depressing the actuator button, the canister's valve stem is depressed to discharge fluid through the aperture at the intended target.

More specifically, the discharge stem of the canister is either placed directly adjacent a small aperture formed in the front end of the housing, whereby the fluid travels directly from the discharge stem and exits out of the small aperture in the housing. Alternatively, an adapter having a small aperture at its front tip is mounted over the discharge stem of the canister with the discharge stem in line with the small aperture of the adapter, and the combination of the adapter and the canister is then placed inside the housing such that the front tip of the adapter mates with a larger opening formed in the front end of the housing, allowing the fluid discharged from the canister's stem to travel through the small aperture in the adapter and exit through the larger opening in the housing.

A safety cover, which can move between an open and a closed position, is also provided over the actuator button to prevent the accidental pressing of the actuator button and the resulting discharge of fluid.

The device of the invention is capable of being operated as either a hand-held device, or by being mounted on another lethal weapon. In the hand-held embodiment, a lanyard attached to the housing unit is provided to allow the user to place the lanyard around the user's wrist so as to make the device available for use at any desired moment, and to prevent the device from unintentionally falling down or separated from the user.

In the alternative embodiment where the device of the invention is intended to be mounted on another lethal weapon or firearm (e.g., a machine gun or a rifle), a bracket is provided with two openings, with one opening being mounted on an appropriate portion of the lethal weapon and the other opening used to hold and carry the device of the invention. In such an embodiment, the user has simultaneous access to the debilitating non-lethal fluid to deliver at the target, or to the use of lethal force, should the latter become necessary. In this alternative embodiment, the lanyard is removed as there is no need for it.

The device of the invention has many advantages, examples of which are: the user can easily hold the unit in hand and ready for discharge in the direction of the target subject while substantially concealing it from the subject; the device uses replaceable canisters, allowing the device to be used indefinitely and avoiding the need to buy the entire assembly when the canister holding the fluid becomes empty; since the canisters are replaceable, the user can practice and learn how to use the device with a canister holding an inert, harmless fluid, and later switch to a canister holding a debilitating chemical fluid of choice, such as mace or pepper spray; the user is able to know which type of fluid is in the unit by viewing applicable indicia on the canister through a view port on the housing; and in addition to having the ability to be hand-held, the device can be mounted onto another lethal weapon to allow the user to have access both to non-lethal/less-than-lethal and lethal force, as needed.

Other features and advantages of the present invention will become more apparent from the following detailed description, taken in conjunction with the accompanying drawings which illustrate, by way of example, the principles of the invention.

DESCRIPTION OF THE DRAWINGS

The accompanying drawings illustrate the invention. In such drawings.

DETAILED DESCRIPTION OF ALTERNATIVE EMBODIMENTS

Figure 1:
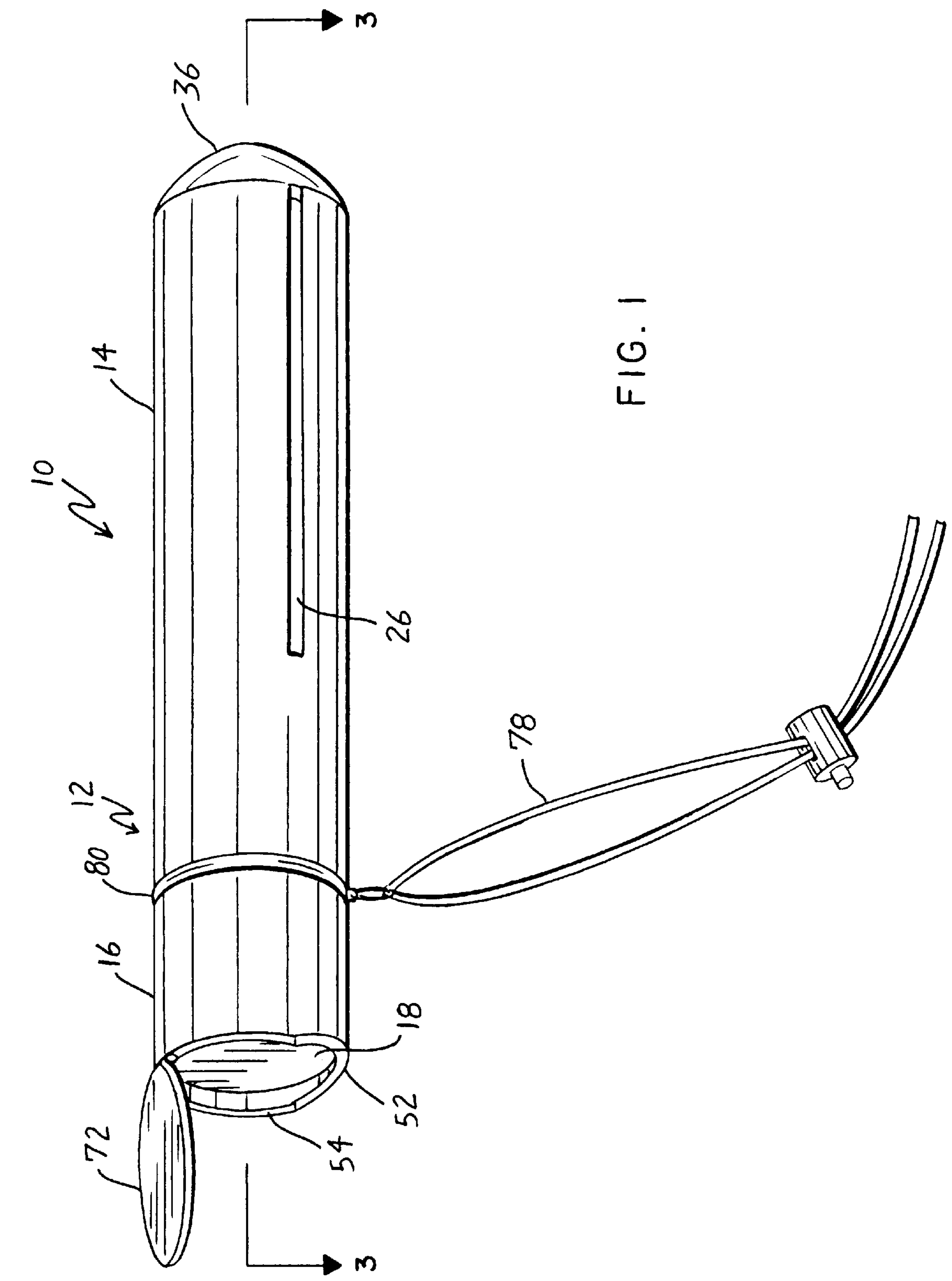
FIG. 1 is a perspective view illustrating a hand-held embodiment of a non-lethal fluid delivery device embodying the novel features of the invention.
Figure 2:
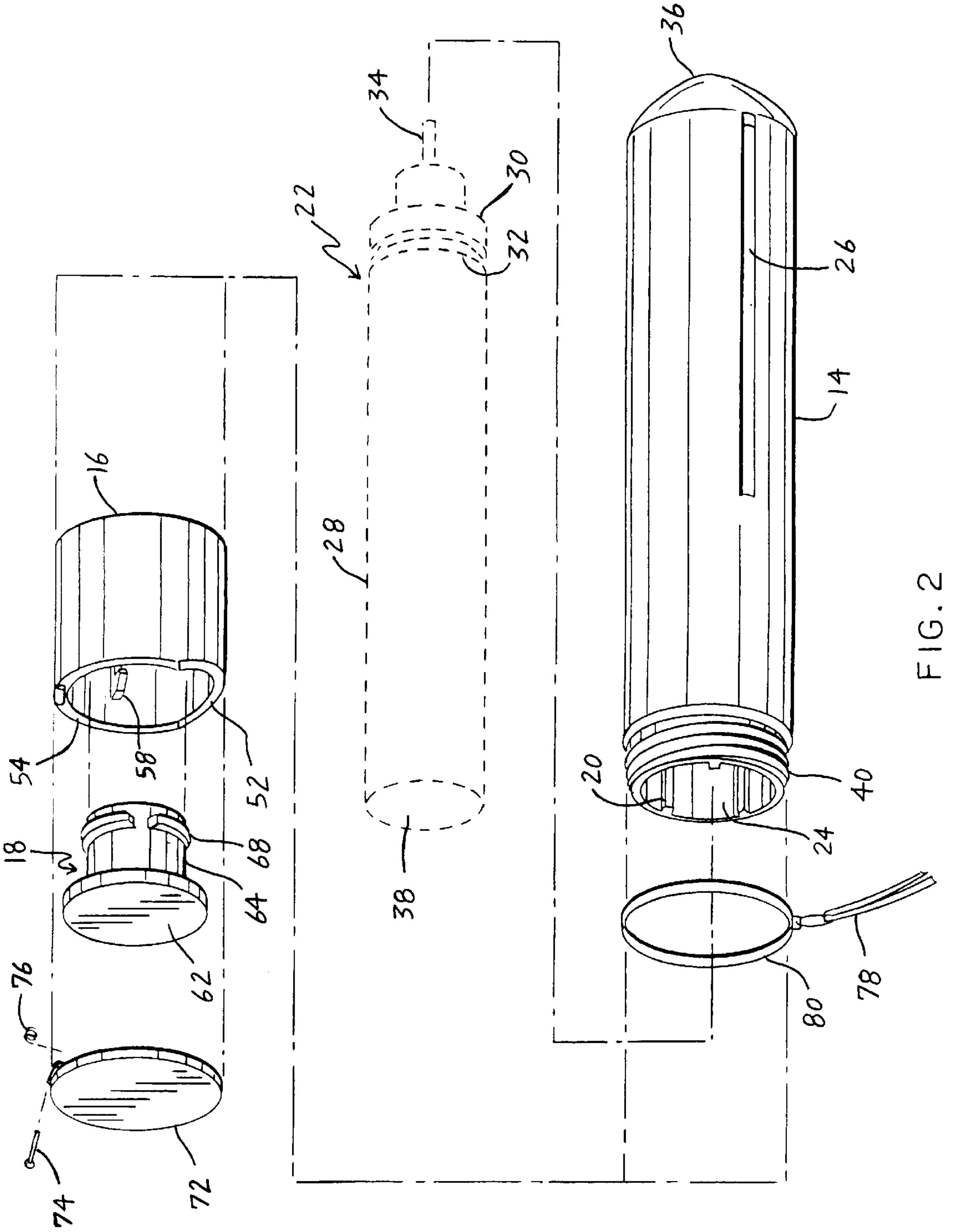
FIG. 2 is a perspective exploded view of the non-lethal fluid delivery device of FIG. 1, showing its various components and a fluid canister shown in broken lines.
Figure 3:
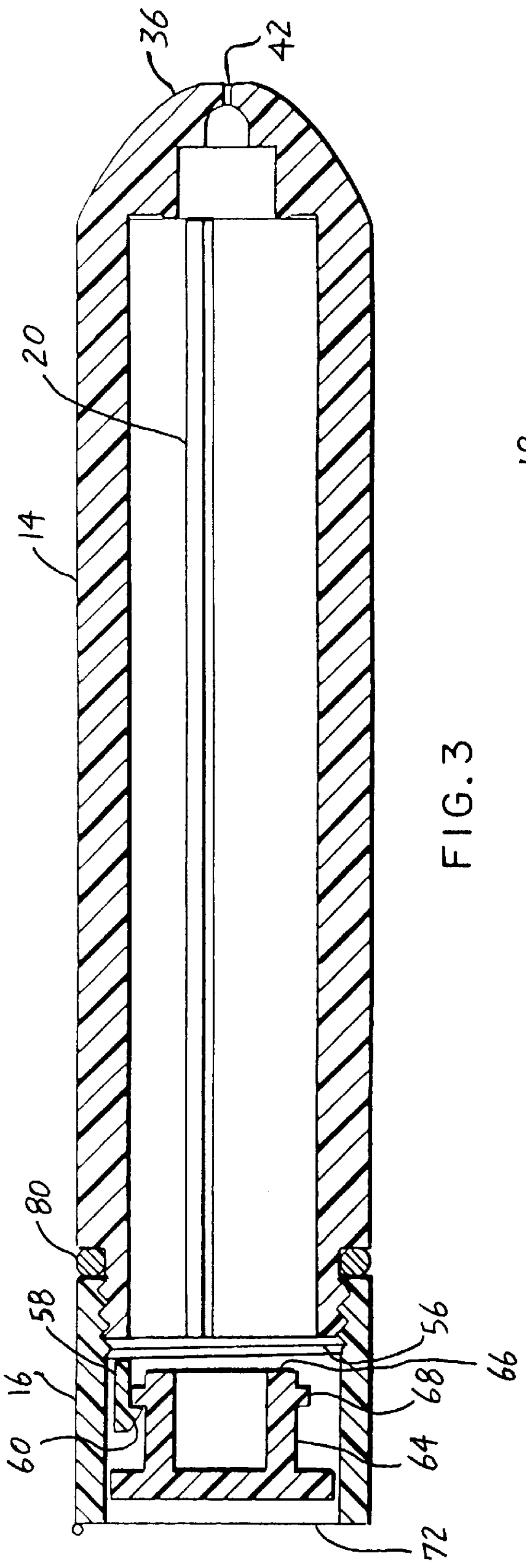
FIG. 3 is a cross-sectional view of the elongated housing of the non-lethal fluid delivery device taken along line 3—3 of FIG. 1.
Figure 5:
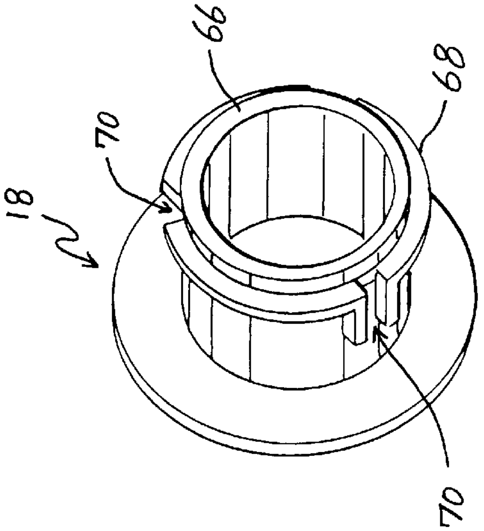
FIG. 5 is a perspective interior view of the actuator button of the device of the invention illustrated in FIG. 1.
Figure 4:
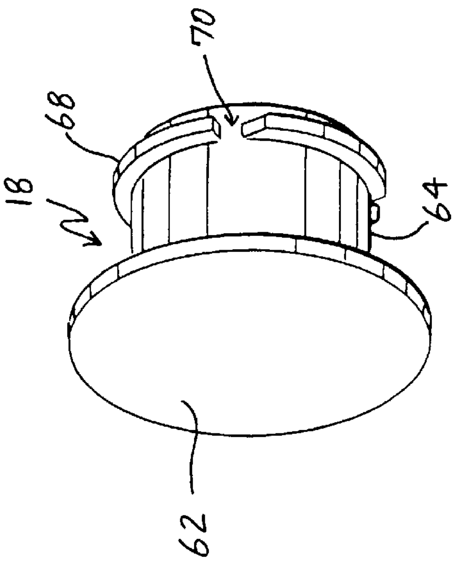
FIG. 4 is a perspective exterior view of the actuator button of the device of the invention illustrated in FIG. 1.

As shown in the exemplary FIGS. 1 through 5, the non-lethal fluid delivery device 10 of the invention is comprised of a housing unit 12 having a generally elongated hollow body 14, a cap 16, and an actuator button 18 located in the cap.

The elongated body 14 has a suitable length and interior diameter, and a plurality of longitudinally oriented ribs 20 formed along its interior, to receive a generally elongated cylindrical canister or other fluid storage vessel 22 containing a debilitating chemical substance, such as mace or pepper spray, or other inert fluid, under pressure. The elongated body 14 is also provided with an open rear end 24 for allowing the canister to be placed therein (with a rear portion of the canister protruding from the open rear end 24 of the elongated body), and a viewing port 26 to permit the user to identify the type of canister placed inside as, for example, by marking the canister with identifying colors or other indicia to distinguish the type of chemical substance carried therein.

The canister 22 is typically formed of a sealed casing or container 28 with a valve housing 30 attached to and located at the canister's front end 32, and a discharge stem 34 attached to and protruding out from the valve housing, where the stem 34 is outwardly biased so as to emit or discharge fluid upon being depressed by an external force, and to stop the discharge of fluid upon the removal of the external force. The canister 22 is placed inside the elongated body 14 through the open rear end 24 thereof, and is positioned such that the valve housing 30 and the discharge stem 34 are directed towards the elongated body's front end 36, and the closed back end 38 of the canister is positioned towards and partially extends outside the open rear end 24 of the elongated hollow body. Once the canister 22 is placed inside the elongated body, the cap 16 is threadably twisted and tightened around corresponding male threads 40 located around the outer surface of the open rear end 24 of the elongated body, thereby securing the canister inside the housing unit 12.

The discharge of fluid from the canister's valve stem is directed outside the device by one of two alternative structures. In one alternative, best illustrated in FIGS. 2 and 3, the front end 36 of the elongated body is shaped in a stepped configuration to correspond to and mate with the canister's valve housing 30 and discharge stem 34. In this embodiment, the tip of the discharge stem is seated adjacent the elongated body's front end 36 which is provided with a centrally located opening or discharge aperture 42, preferably having a diameter of 0.014 inches, to allow the fluid to be directed from the device in a flow stream to the intended target located a few or several feet away.

Figure 6:
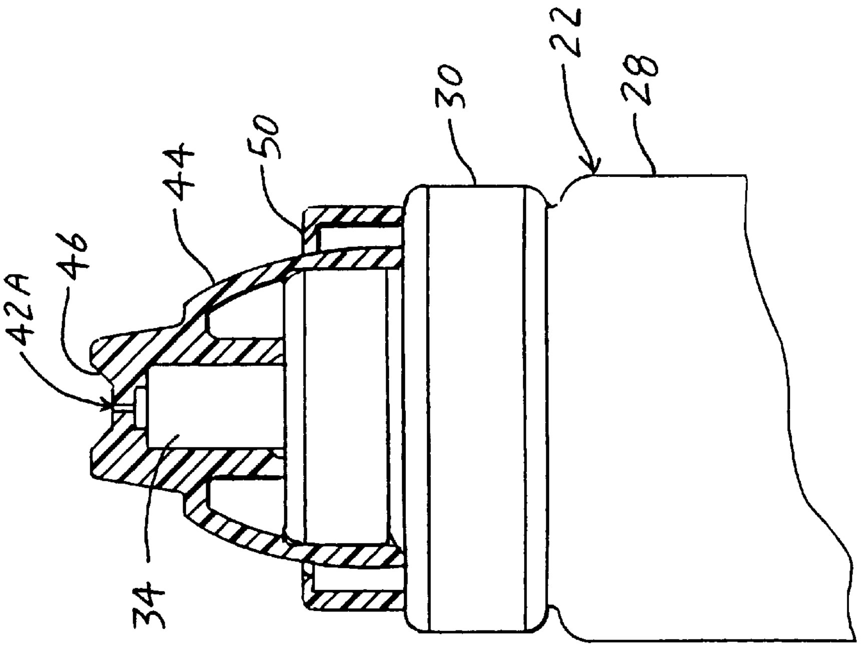
FIG. 6 is an elevational view of a canister used in the invention illustrated in FIG. 1, showing an alternative adapter in cross-section placed on the canister, and the canister shown in its activated fluid discharge position.
Figure 7:
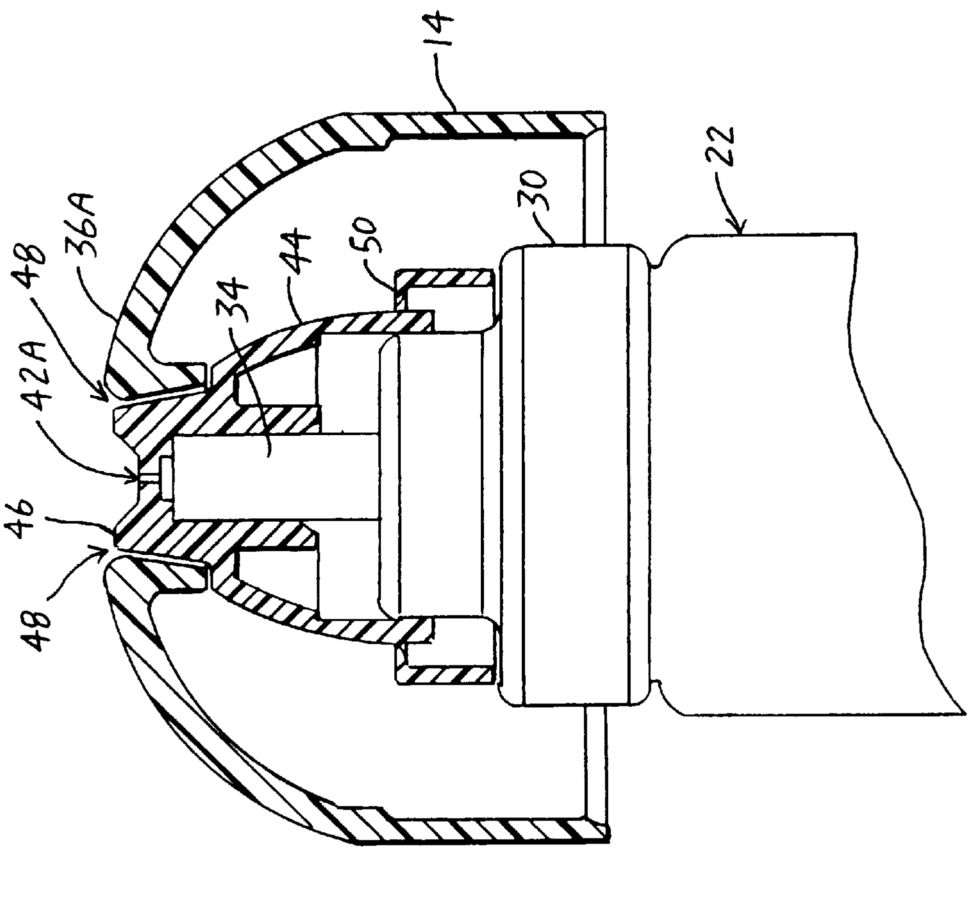
FIG. 7 is similar to FIG. 6, in addition showing the interface between the adapter in FIG. 6 with an alternative form of the front end of the elongated housing of the invention.

In an alternative embodiment, best illustrated in FIGS. 6 and 7, an adapter 44 having a stepped configuration to correspond to and mate with the canister's valve housing 30 and discharge stem 34 is mounted on and affixed around a portion of the valve housing (such as by press fitting), and placed over the discharge stem. In this embodiment, rather than the narrow discharge aperture being part of and formed in the elongated body, a similar discharge aperture 42A, also preferably having a diameter of 0.014 inches, is formed in the front tip portion 46 of the adapter 44. In this embodiment, the canister with the adapter are together placed inside the elongated housing, where the front tip portion 46 of the adapter 42A (with the discharge aperture 42A located therein) fits into and mates with a correspondingly larger sized opening 48 in the corresponding front end 36A of the elongated body 14 with a modified interior configuration. The adapter is also provided with a frangible ring 50 at the back end thereof. When a fresh, full canister is used for the first time, the forward movement of the canister causes the canister's valve housing 30 to push against the frangible ring 50, and since the front tip portion 46 of the adapter 44 is seated against the modified front end 36A of the elongated body 14 and cannot move forward, the breakable connections between the frangible ring and the adapter are broken so as to separate the frangible ring from the remainder of the adapter upon the first usage of the canister. In this manner, the user is able to determine whether a particular canister is a fresh and full canister, or whether it has previously been used at least once.

As illustrated in FIGS. 2 through 5, the cap 16 is provided with a thumb rest 52 at its rear end 54, and a radially inwardly projecting shoulder 56, from which one or more latch posts 58 project rearwardly, wherein the latch posts are spaced from the internal diameter of the cap and have rear ends having radially inward projecting latch fingers 60 with ramped surfaces. The cap interfaces with and houses an actuator button 18, which has a flat disc portion 62 and an annular sleeve 64 formed integrally with and projecting outwardly from the flat disc 62, where the axial outward face of the annular sleeve 64 forms a contact surface 66 for contacting the closed back end 38 of the canister 22. The annular sleeve 64 of the actuator button 18 is further provided with an outer latch ring 68 that projects radially outward and has one or more axially open slots 70 designed for rotational alignment with the one or more corresponding latch posts 58. In this manner, after aligning the latch posts of the cap 16 with the corresponding slots 70 in the actuator button 18, the actuator button is slightly pushed in towards the front of the housing unit and rotated to place it in locking connection with the cap.

With the canister placed in the housing unit and the actuator button locked in place, a small forward movement of the actuator button causes contact between the contact surface 66 and the closed back end 38 of the canister, which in turn causes the canister's discharge stem 34 to be depressed to discharge fluid either through the discharge aperture 42 that is formed at the front end 36 of the elongated body 14, or through the discharge aperture 42A formed at the front tip 46 of the adapter 44 and exiting through the larger opening 48 in the modified front end 36A of the elongated hollow body (as per the two alternative embodiments of the location of discharge aperture described above). Upon the release of pressure from the actuator button 18, the outward bias in the canister's discharge stem 34 causes it to move outward towards its non-depressed or rest position so as to stop the discharge of fluid from the canister, which also causes the canister and the actuator button to move backward, with the backward movement of the actuator button being limited by the contact between the latch fingers 60 of the cap 16 and the outer latch ring 68 of the actuator button 18.

A safety cover 72 generally corresponding to shape of the flat disc 62 of the actuator button is also provided to prevent the accidental pressing of the actuator button and discharge of fluid. A combination of a pin 74 and a torsion spring 76 is used to moveably connect the safety cover 72 to the cap 16 such that the safety cover can be flipped between an open position providing access to the actuator button, and a closed position to prevent access to the actuator button, as necessary.

The device of the invention is provided in a hand-held version and a version mounted on another weapon. In the hand-held embodiment of the device, illustrated in FIGS. 1 and 2, an adjustable lanyard or other chord or strap 78 is provided, which can be attached by a ring or other looped connection 80 placed over the open rear end 24 of the elongated body 14 before the cap 16 is secured to the elongated body. As such, the user can wear the lanyard or strap around his or her wrist so as to be able to release the device of the invention without fear of dropping or losing it or having to reholster it during short periods of non-use.

In action, with the hand-held embodiment of the invention properly assembled (i.e., the canister properly placed inside the elongated body, and the cap and the actuator button in place secured to the elongated body), the user removes the device of the invention from a belt holster and holds it in a relatively concealed and highly tactical manner by having the thumb on the thumb rest and the other fingers wrapped around the elongated body to properly grip the device in a comfortable position. With proper hand control, the device of the invention can be deployed by positioning the thumb on the thumb rest of the cap and easily flipping the safety cover open so as to allow the user to place the thumb over the actuator button. If desired, the user can hold the device without holding any other weapon, or alternatively, the device can be held using a position known by law enforcement officers as the Harries flashlight position, a position that allows a handgun or revolver to be used in the dominant hand and the non-lethal weapon of the invention in the other hand in a crossed position with the dominant hand's wrist resting on the other hand's wrist. In such a manner, both the non-lethal weapon of the invention and another lethal weapon such as a handgun can simultaneously be available to the individual user to freely and easily point at the subject and decide to discharge the one weapon that is appropriate depending on the particular circumstances.

Figure 8:
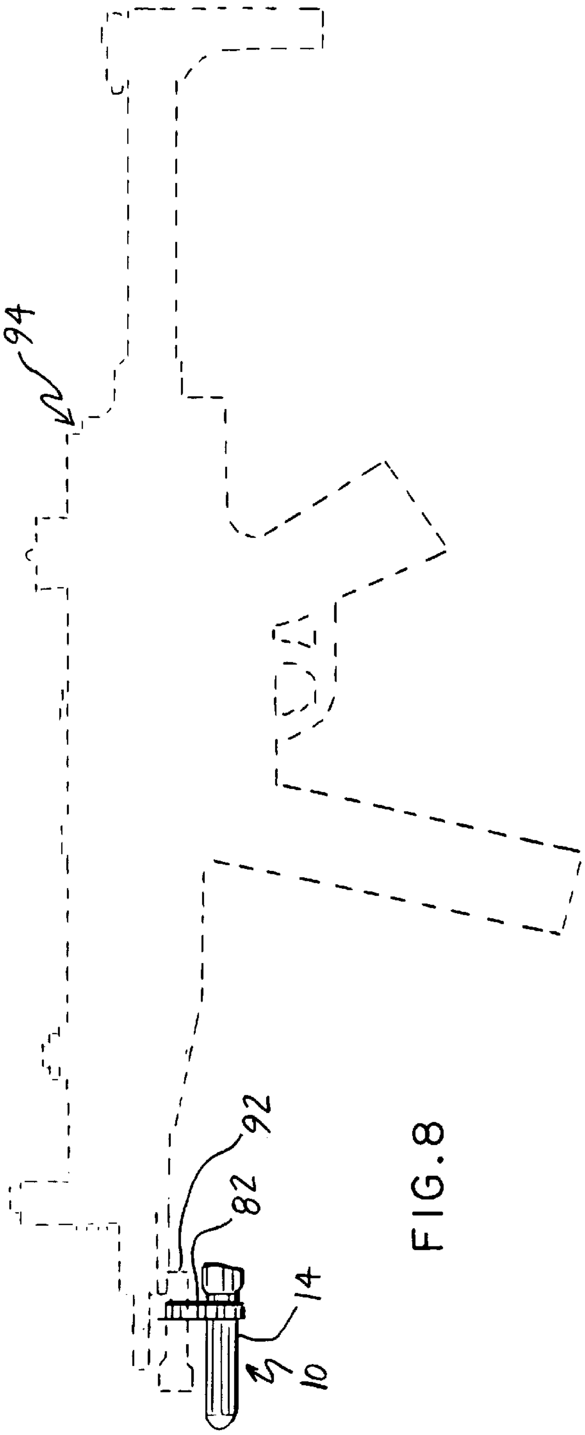
FIG. 8 is a side elevational view of an alternative embodiment of the invention mounted by way of a bracket on a lethal fire arm, an example of which is shown as an MP-5 machine in broken lines.
Figure 9:
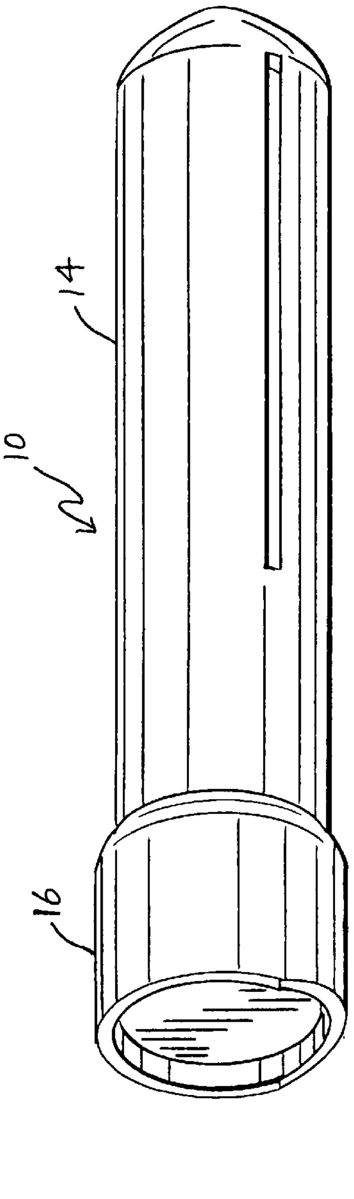
FIG. 9 is a perspective view illustrating the alternative embodiment of the non-lethal fluid delivery device shown in FIG. 8.
Figure 10:
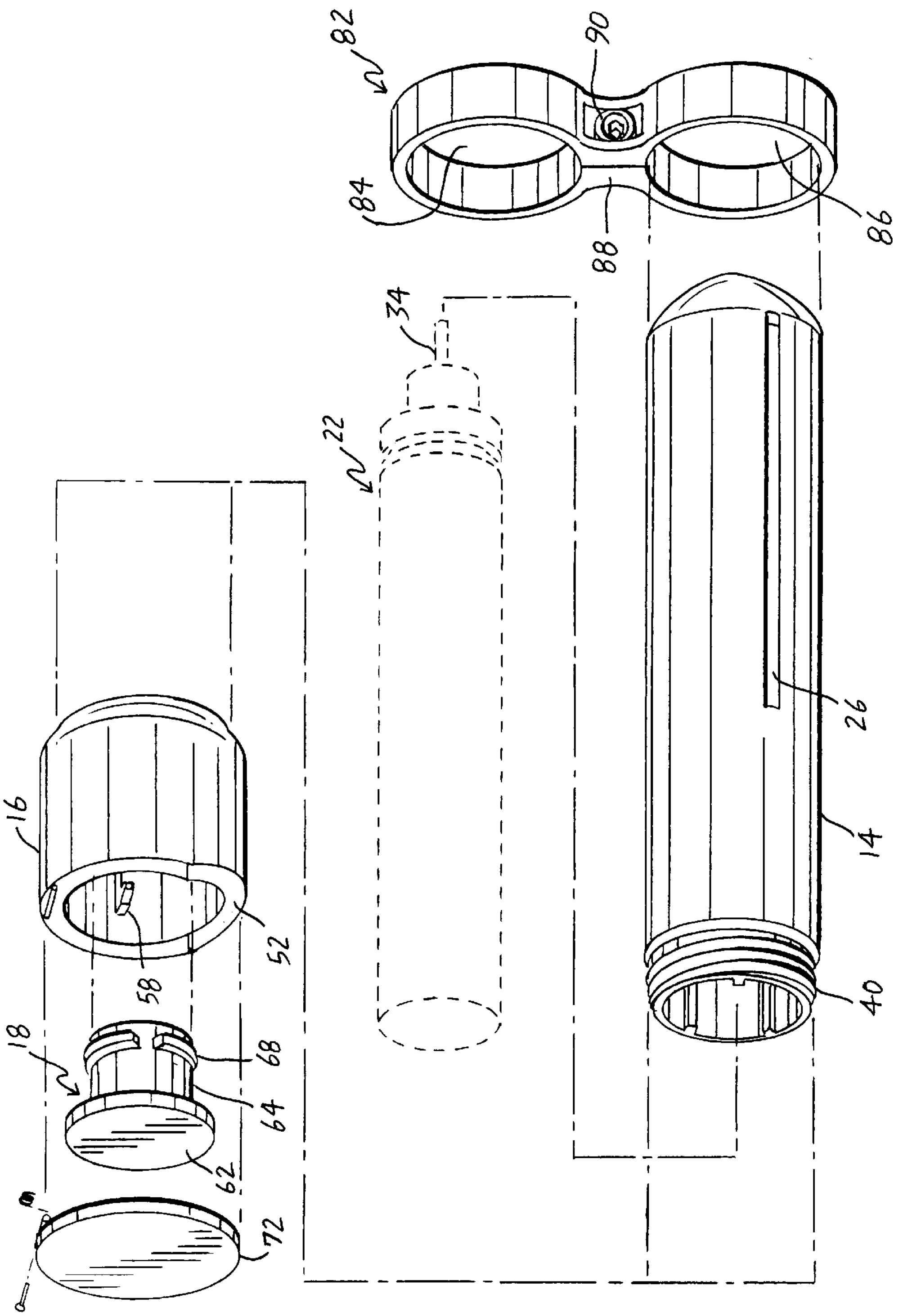
FIG. 10 is a perspective exploded view of the alternative embodiment of the invention illustrated in FIGS. 8 and 9, with a fluid canister shown in broken lines.
Figure 11:
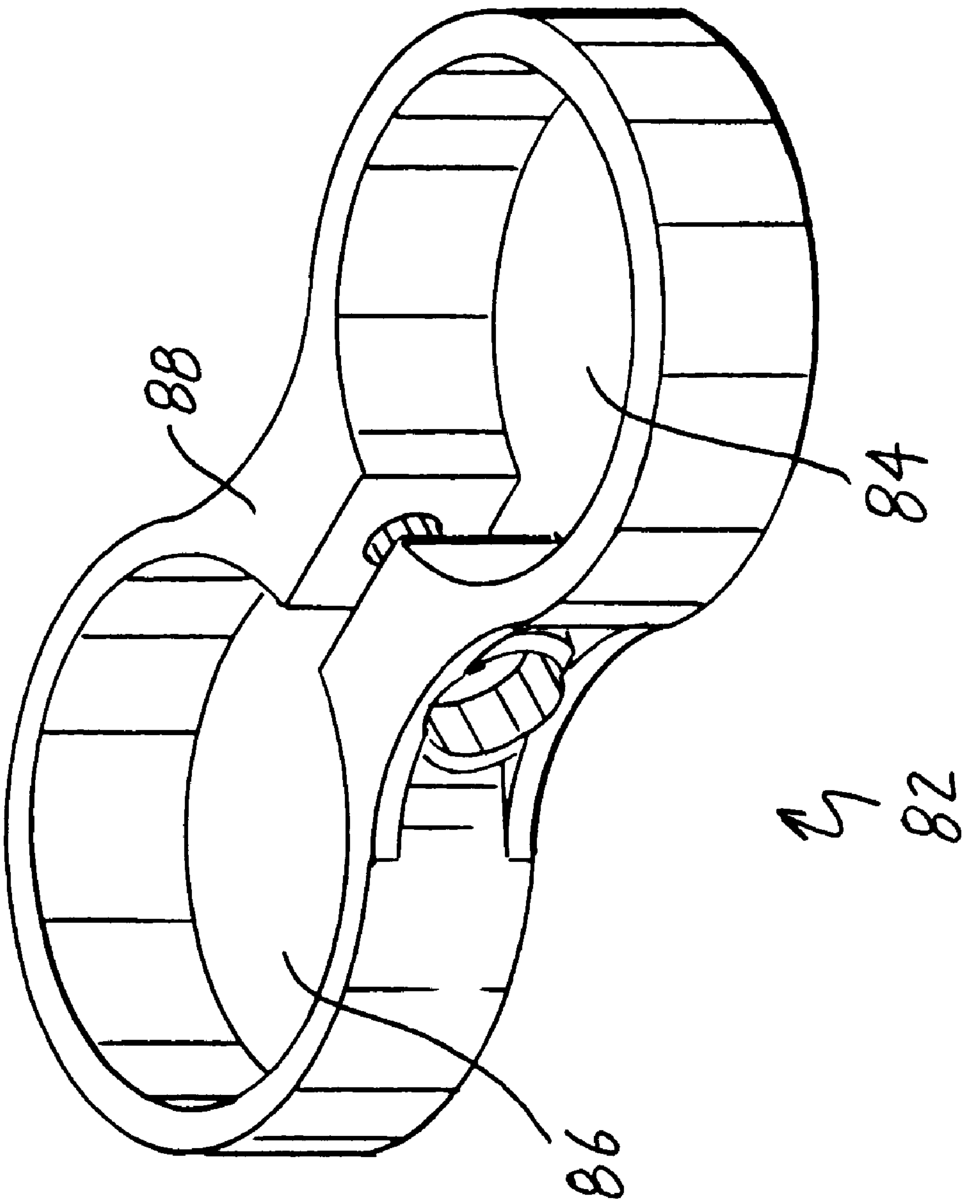
FIG. 11 is a perspective view of the bracket illustrated in FIGS. 8 and 10 used for mounting the alternative embodiment of the invention on a fire arm.

In the alternative mounted embodiment of the invention, illustrated in FIGS. 8 through 11, a clamp or bracket 82 is provided, wherein the bracket has two annular openings 84 and 86 joined along a common side in a generally "figure 8" by a split clamping bridge segment 88 with a clamp screw or bolt 90 used to fasten the split segments for adjusting the diameter of the annular openings 84 and 86. Such a bracket is used to mount the device of the invention on a shotgun, rifle or other weapon. For example, FIG. 8 shows the bracket 82 mounted by way of the first opening 84 over the flashlight carrying mount attachment 92 of an MP-5 machine gun 94. In this manner, the device of the invention can be mounted through the second opening 86 of the bracket, and by adjusting the screw/bolt 90, the bracket can be tightened around the device of the invention and the light mount of the MP-5 machine gun or other weapon. In using the device of the invention in this manner, when the user approaches a target with the MP-5 machine gun or other lethal weapon and anticipates the possibility of use of non-lethal fluid, the user flips the safety cover 72 of the device of the invention open for preparation. When the user decides to direct non-lethal fluid on the target, the user points the device at the target and places his or her thumb of the non-dominant hand on the actuator button 18 to discharge the chemical fluid, while having the dominant hand available to pull the trigger on the MP-5 or other lethal weapon should the danger escalate and the use of deadly force become necessary.

The fluid delivery device of the invention thus provides a device that uses an interchangeable, replaceable canister or container holding a debilitating or inert fluid of choice, and allows the user to easily and concealably hold in one hand and point the device at the subject while holding another weapon in another hand, as well as the ability to attach the device to another lethal weapon for simultaneous access to lethal and non-lethal force.

A variety of further modifications and improvements in and to the non-lethal fluid delivery device of the invention will be apparent to persons skilled in the art. Accordingly, no limitation on the invention is intended by way of the foregoing description and accompanying drawings, except as set forth in the appended claims.

What is claimed is:

1. A fluid delivery device for directing a debilitating pressurized fluid at a selected target, said device comprising:

a fluid containing canister having a discharge nozzle at one end and an opposite base end;

an elongated hollow body removably receiving and supporting said canister, said hollow body having an opening at a first end thereof for passage of fluid and an opposite second end, with said canister being moveable within said hollow body between a first rest position and a second fluid discharge position; and an actuator button carried by said elongated hollow body for displacing said canister between said rest position and said second fluid discharge position, wherein said actuator button is moveable along a longitudinal axis of said elongated hollow body.

2. The fluid delivery device of claim 1, further comprising a safety cover adapted to move between a first position to prevent the movement of said actuator button and a second position to allow the movement of said actuator button.

3. The fluid delivery device of claim 1, wherein said actuator button contacts said base end of said canister to displace said canister between said first rest position and said second fluid discharge position.

4. The fluid delivery device of claim 1, wherein said second end of said hollow body is open, and further comprising a cap attached to said second end of said hollow body for removably securing said canister inside said hollow body.

5. The fluid delivery device of claim 4, wherein said actuator button is connected to said cap.

6. The fluid delivery device of claim 5, wherein said actuator button is moveable along a longitudinal axis of said elongated hollow body.

7. The fluid delivery device of claim 1, further comprising an adapter mounted on said discharge nozzle of said canister, said adapter having an aperture at a first end thereof for passage of fluid from said discharge nozzle through said aperture, said adapter having a configuration adapted to be placed inside said hollow body and mate with said first end of said hollow body, with said aperture positioned adjacent said opening in said hollow body to allow passage of fluid between said aperture and said opening.

8. In a fluid delivery device for use with a removable canister containing a debilitating fluid for directing at a selected target and said canister having a discharge nozzle at one end and an opposite base end, said fluid delivery device comprising:

an elongated hollow body adapted for removably receiving and supporting said canister and further adapted to permit said canister to move within said hollow body between a first rest position and a second fluid discharge position, said hollow body having an opening at a first end thereof for passage of fluid and an opposite second end;

an actuator button carried by said elongated hollow body for displacing said canister between said first rest position and said second fluid discharge position, wherein said actuator button is moveable along a longitudinal axis of said elongated hollow body.

9. The fluid delivery device of claim 8, further comprising a safety cover adapted to move between a first position to prevent the movement of said actuator button and a second position to allow the movement of said actuator button.

10. The fluid delivery device of claim 8, wherein said actuator button contacts said opposite base end of said canister to displace said canister between said first rest position and said second fluid discharge position.

11. The fluid delivery device of claim 8, wherein said second end of said hollow body is open, and further comprising a cap attached to said second end of said hollow body for removably securing said canister inside said hollow body.

12. The fluid delivery device of claim 8, further comprising an adapter mounted on said discharge nozzle of said canister, said adapter having an aperture at a first end thereof for passage of fluid from said discharge nozzle through said opening, said adapter having a configuration adapted to be placed inside said hollow body and mate with said first end of said hollow body, with said aperture positioned adjacent said opening in said hollow body to allow passage of fluid between said aperture and said opening.

13. A fluid carrying canister for use with a debilitating fluid delivery device having an elongated hollow body for receiving and supporting said canister and an opening at a first end of said hollow body for passage of fluid, said canister comprising:

a sealed container having a valve attached to one end thereof, said valve including a discharge stem moveable between a first rest position and a second fluid discharge position to allow discharge of fluid from said container;

an adapter mounted on said discharge stem, said adapter having an aperture for directing the fluid from said discharge stem through said aperture and exiting through said opening in said hollow body;

said adapter having a configuration adapted to be placed inside said hollow body and mate with said first end of said hollow body, with said canister adapted for placement in said hollow body to discharge fluid from said container upon displacement of said container in said hollow body between a first rest position and a second fluid discharge position;

and said adapter having a frangible member which breaks upon discharge of fluid to indicate that said canister has been activated at least once.

* * * * *